H. P. JONES.
Improvement in Oscillating Steam-Valves.
No. 130,506. Patented Aug. 13, 1872.
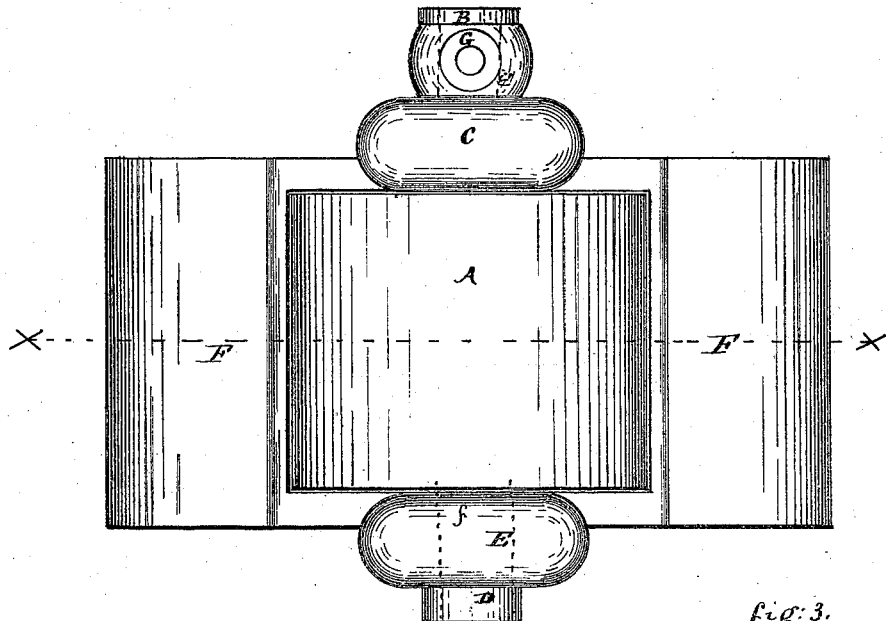
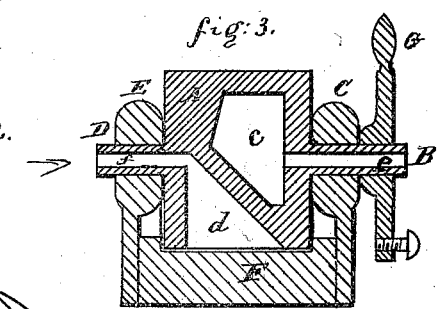
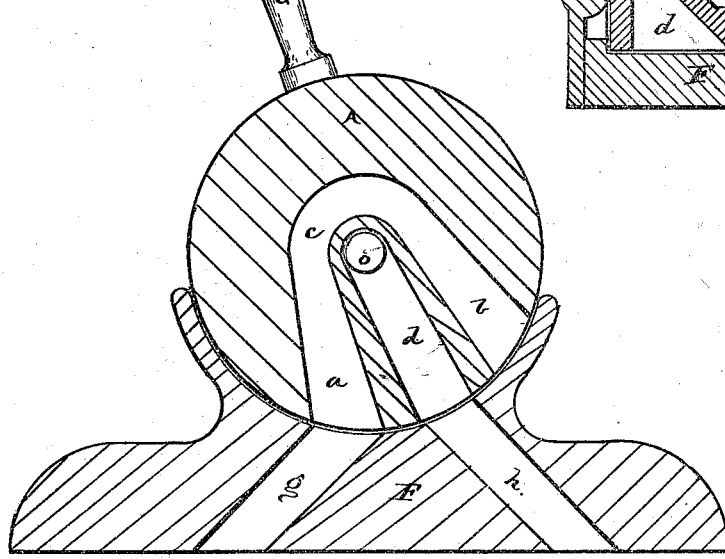
Witnesses:
Franklin Barritt.
Rich'd Gerner.
Inventor:
Harry P. Jones
per Henry Gerner
Attorney.

UNITED STATES PATENT OFFICE.

HARRY P. JONES, OF DAVENPORT, IOWA.

IMPROVEMENT IN OSCILLATING STEAM-VALVES.

Specification forming part of Letters Patent No. 130,506, dated August 13, 1872.

Specification describing certain Improvements in Steam-Valves, invented by HARRY P. JONES, of the city of Davenport, State of Iowa.

The object of my invention is to produce a steam-valve for steam-engines which is simpler in construction and less liable to get out of order than the present used steam-engine valves.

In order to describe my invention more fully I will refer to the accompanying drawing.

Figure 1 is a plan view of a steam-valve embodying my invention. Fig. 2 is a cut section through line $x\,x$, Fig. 1.

A is the steam-valve proper, formed of a solid cylinder, into which are introduced the steam-passages $a$ and $b$, which communicate together through passage $c$. $d$ is a third passage, which communicates with the side of the valve, into which is introduced the hollow shaft B, which rests on bearings C, and through the bore $o$ of this shaft the steam is exhausted. D is the other hollow shaft, which rests in the bearing E. $f$ is a hole in the hollow shaft D, which communicates with the steam-passage $c$ in the interior of the valve, and through which the steam is introduced into the cylinder. F represents one side of a steam-cylinder on which the valve A is placed. $g$ and $h$ are the passages into which steam is introduced and again exhausted through the action of the valve. G is a shaft, giving motion to the valve.

Having thus described my invention, I desire to claim—

The steam-valve A, with passages $a, b, c$, and $d$, in combination with the hollow shafts B and D having bores $e$ and $f$, bearings C and E, the steam-cylinder F, and shaft G, substantially as and for the purpose hereinbefore set forth.

This specification signed by me this 14th May, 1872.

H. P. JONES.

Witnesses:
ADOLF VEHME,
RICHARD GERNER.